J. W. FERGUSON.
HOSE COUPLING.
APPLICATION FILED APR. 15, 1909.

965,286.

Patented July 26, 1910.

Witnesses:
Warren N Akers
M. G. Knight

Inventor,
Joseph W. Ferguson,
By A. B. Upham,
Attorney.

UNITED STATES PATENT OFFICE.

JOSEPH W. FERGUSON, OF QUINCY, MASSACHUSETTS.

HOSE-COUPLING.

965,286.

Specification of Letters Patent. Patented July 26, 1910.

Application filed April 15, 1909. Serial No. 490,171.

*To all whom it may concern:*

Be it known that I, JOSEPH W. FERGUSON, a citizen of the United States, residing at Quincy, county of Norfolk, and Commonwealth of Massachusetts, have invented certain new and useful Improvements in Hose-Couplings, of which the following is a specification.

This invention is in the line of couplings for the hose pipes of fire engines, especially, and it has for its object the construction of improved means for enabling such couplings to be instantaneously engaged one with the other; also to means for preventing the couplings from reëngaging while they are being unscrewed; and to other improvements in details of construction hereinafter set forth.

Figure 2:
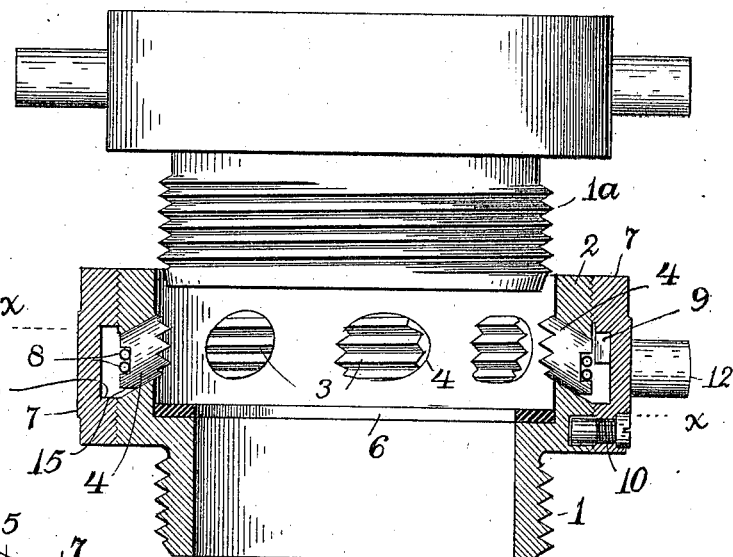
Figure 3:
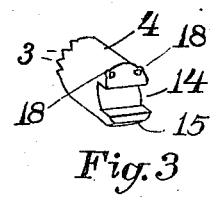
Figure 1:
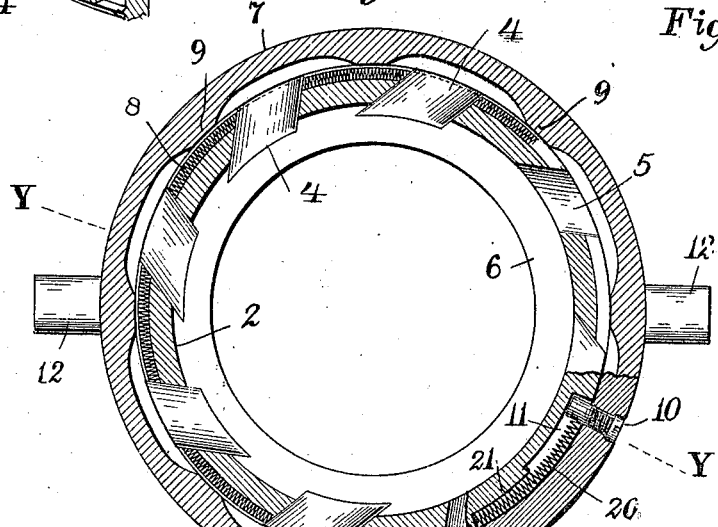

Referring to the drawings forming part of this specification, Figure 1 is a sectional plan view on the line X—X in Fig. 2 of a coupling-member embodying my invention. Fig. 2 is a section through Y—Y in Fig. 1 of said member. Fig. 3 is a view of the retreating block, and Fig. 4 of hole for same.

As shown in Fig. 2, a coupling member consists of the externally threaded section 1, and a socket 2 containing the internal screw-threads for engagement by the externally-threaded section 1ª of another coupling-member. To permit such engagement to be instantaneous, said internal screw threads 3 are formed in the inner ends of retreating blocks 4 retained in their normal position by suitable resilient means. Said blocks are loosely held in openings 5 in the sides of the socket 2, which are downwardly inclined outwardly, as shown in Fig. 2; and accordingly, when the male end 1ª of another coupling member is thrust into the socket 2, and is pressed against the threaded ends of the blocks 4, the latter are forced thereby back, down and within their openings until such male end has seated itself against the rubber washer 6. Such introduced member is then held by said threaded blocks which are pressed into engagement therewith by their resilient means, and a partial turn thereof forces it into water-tight contact with said washer. Although said introduced member cannot be withdrawn from the socket 2 without unscrewing it in the usual manner, it is found when thus unscrewing it, the weight of the attached hose will continually force it back into the socket again, thereby rendering it almost impossible for one man unaided to unscrew a coupling of this character. Such a nuisance has this proved to be that no fire station will long keep the same in use, notwithstanding its manifest convenience for quick coupling. To overcome this defect of interlocking, I have provided the sleeve 7, which surrounds said socket 2 and conceals the outer ends of the blocks 4 and their springs 8, with locking lugs 9, which, when a partial turn is given to said sleeve, come into the paths of said blocks and prevent their yielding to the pressure of the male section 1ª. The action of this sleeve is made automatic by means of the pin or screw 10 projecting from said sleeve into a slot 11 in said socket. The length and location of said slot is so arranged that the turn of said sleeve to its limit in one direction will take said lugs out from the paths of said blocks, while a turn to the limit in the opposite direction will bring said lugs into their locking position. Said sleeve being provided with radial ears 12 by means of which they are held by the customary coupling-wrench, the turn which will be given to said sleeve relative to the parts within when the male member is being unscrewed therefrom, will bring said blocks and lugs into juxtaposition, and so lock the said blocks against retreating under any return which may be given to the said male member by the weight of the hose. Further, when the members are to be coupled, a screwing-in motion will naturally be applied to the male member. The effect of this will be to turn the socket within the sleeve 7 and so release the blocks from the lugs 9, thereby permitting said blocks to retreat and permit the entrance of said male member.

As shown in Fig. 1, the blocks 4 are arranged somewhat tangentially, as well as externally depressed as illustrated in Fig. 2. The purpose of this is two-fold: It frequently happens that some dust or dirt gets into the openings 5 about the blocks so that they do not retreat easily enough as the male member is thrust into the socket, but as a screwing-in motion is given said male member as the latter is inserted in the socket, this movement added to the direct pressure serves to effectually start said blocks in the required centrifugal motion. Another advantage is the increased length of opening given by such tangential arrangement in comparison with radially arranged openings. Consequently the wall of the socket can be made thinner than would otherwise be the case, and the coupling reduced in size.

The resilient means for returning the blocks 4 into engagement with the male screw member inserted in the socket 2 is preferably one or more fine helical springs 8 wrapped about the socket in a suitable groove 13 therein, and also in notches 14 in the ends of the blocks, as shown in Figs. 2 and 3.

The blocks 4 being cylindrical, it is necessary to provide some means for keeping them from turning in the holes 5. Ordinarily, the springs 8 by their location in the notch 14 of a block, and the groove 13 of the socket, are sufficient for the purpose; but when the blocks are pressed down and outward by the in-forced male screw 1ª, the sections of the springs immediately beside the blocks are brought outside the groove 13, and so in danger of being carried up or down into engagement with the edges of the said groove, should the blocks get slightly turned, as they are so apt to and are no longer prevented by the above-described co-action of the springs and grooves. With the springs thus caught upon the groove-edges, the blocks are no longer pressed inward, and the introduced male screw 1ª fails to be engaged and held. To prevent such turning of the blocks when thus pressed back, I form a shoulder 15 at the lower edge or corner of each block 4, which by coming into contact with the lower shoulder 16 of the sleeve 7 when the blocks reach their outward and downward limit, accomplishes the desired result. Such turning of the blocks is objectionable for the reason above set forth, but even more so because of the danger of their threads crossing the threads of the male screw and so being unable to enter between the latter.

Figure 4:
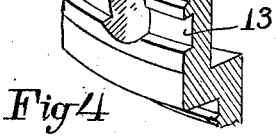

The blocks are kept from accidental removal from their openings or holes 5 in the following manner: As shown in Fig. 4, a groove 17 is turned about the exterior of the socket 2, preferably at the upper parts of said holes. Then the blocks have a couple of points 18 prick-punched out therefrom into said groove, as shown in Fig. 3; such out-jutting points of metal serving to hold the blocks from going inward too far.

It sometimes occurs that when the coupling member is held by a fireman, he does not grasp the sleeve 7 as the male member 1ª is being inserted into the socket or female section 2, but takes hold of the hose connected with the said coupling-member. When this is done, the above-described automatic means for releasing the blocks from the presence of the locking lugs 9, do not operate, and he must then stop to turn the sleeve by hand. To insure the automatic operation under all circumstances, I provide a resilient means for normally keeping the said sleeve in its position for holding its locking lugs 9 out of the path of the blocks. I prefer to do this by means of a spiral spring 20 located within the slot 11 and a reduced prolongation 21 thereof, and pressing against the pin or screw 10. This spring acts to turn said sleeve to the position illustrated in Fig. 1, and hence with its locking lugs out of the path of the blocks. This spring does not interfere with the opposite turn of the sleeve 7 when the spanner is applied thereto in unscrewing the couplings, and said locking lugs are brought to their locking engagement with said blocks.

I prefer to secure the sleeve in rotative engagement with the socket by forming them with mutually engaging screw threads loosely enough fitting to permit the desired relative movements thereof, as shown in Fig. 2.

What I claim as my invention and for which I desire Letters Patent is as follows, to wit:—

1. An automatic coupling comprising a socket having openings through its wall, terminally-threaded blocks slidable in said opening, and a sleeve rotatable about said socket and blocks; said sleeve being provided with projections on its inner face which can be brought into or out of the paths of said blocks by a partial turn of said sleeve, means limiting the movement of said sleeve whereby at one limit said projections are out of said paths, and at the other limit said projections are in said paths, and resilient means yieldingly holding said sleeve with its said projections out of said paths.

2. An automatic coupling comprising a socket having openings through its wall, terminally threaded blocks slidable in said openings, and resilient means pressing said blocks inwardly, said openings being each inclined in two directions, one direction being relative to the axis of the coupling and the other direction being relative to a tangent drawn to the periphery at such point.

3. An automatic coupling comprising a socket, retreating terminally threaded cylindrical blocks carried by said socket, resilient means pressing said blocks inward, and a rotatably carried sleeve about the same; each of said blocks having a flat shoulder at one edge, and said sleeve having a surface adapted to flatly contact with said shoulders when the blocks are pressed to their limits outwardly, and so prevent their turning.

In testimony that I claim the foregoing invention, I have hereunto set my hand this 14th day of April, 1909.

JOSEPH W. FERGUSON.

Witnesses:
 A. B. UPHAM,
 WARREN N. AKERS.